(12) United States Patent
Blaeser

(10) Patent No.: US 9,211,926 B1
(45) Date of Patent: Dec. 15, 2015

(54) MOTORCYCLE FENDER COSMETIC ENHANCEMENT/KICKSTAND SUPPORT

(71) Applicant: David M. Blaeser, Centerville, MN (US)

(72) Inventor: David M. Blaeser, Centerville, MN (US)

( * ) Notice: Subject to any disclaimer, the term of this patent is extended or adjusted under 35 U.S.C. 154(b) by 0 days.

(21) Appl. No.: 14/203,694

(22) Filed: Mar. 11, 2014

Related U.S. Application Data

(63) Continuation-in-part of application No. 13/680,163, filed on Nov. 19, 2012, now abandoned.

(51) Int. Cl.
*B62H 1/02* (2006.01)

(52) U.S. Cl.
CPC ......................................... *B62H 1/02* (2013.01)

(58) Field of Classification Search
USPC .................................. 280/293, 295, 298, 301
See application file for complete search history.

(56) References Cited

U.S. PATENT DOCUMENTS

| | | | | |
|---|---|---|---|---|
| 3,826,026 A | * | 7/1974 | Bevan | 40/644 |
| 4,474,387 A | * | 10/1984 | Maranell et al. | 280/293 |
| 4,521,031 A | * | 6/1985 | Huth | 280/293 |
| 4,625,987 A | * | 12/1986 | Marsh | 280/293 |
| 5,077,925 A | * | 1/1992 | Herrera et al. | 40/642.02 |
| 5,484,153 A | * | 1/1996 | Ricciardi | 280/293 |
| 5,503,420 A | * | 4/1996 | Consiglio et al. | 280/288.4 |
| 5,771,619 A | * | 6/1998 | Wells | 40/643 |
| 7,621,550 B1 | * | 11/2009 | Boruff et al. | 280/293 |
| 2004/0262880 A1 | * | 12/2004 | McClure | 280/293 |

* cited by examiner

*Primary Examiner* — Sarah McPartlin
(74) *Attorney, Agent, or Firm* — Dave Alan Lingbeck

(57) ABSTRACT

A motorcycle fender cosmetic enhancement/kickstand support for easily enhancing the appearance of motorcycles and to stabilize parked motorcycles. The motorcycle fender cosmetic enhancement/kickstand support includes a planar support member having a top, a bottom, opposed ends and sides, and a thickness and adapted to being magnetically attached to a fender of a motorcycle; and a pad member removably supported by the planar support member.

1 Claim, 3 Drawing Sheets ically attached to a fender of a motorcycle; and a pad member removably supported by the planar support member. None of the prior art includes the combination of the elements of the present invention.

MOTORCYCLE FENDER COSMETIC ENHANCEMENT/KICKSTAND SUPPORT

CROSS-REFERENCE TO RELATED APPLICATIONS

The present application claims the benefit of the U.S. non-provisional application Ser. No. 13/680,163, filed on Nov. 19, 2012, the disclosure of which is expressly incorporated by reference herein in its entirety.

BACKGROUND OF THE INVENTION

1. Field of the Invention

The present invention relates to fender attachments or kickstand supports and more particularly pertains to a new motorcycle fender cosmetic enhancement/kickstand support for easily enhancing the appearance of motorcycles and to stabilize parked motorcycles.

2. Description of the Prior Art

The use of fender attachments or kickstand supports is known in the prior art. More specifically, fender attachments or kickstand supports heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a kickstand puck where its thickness matches the gap between the frame and isolation pad of a motorcycle floorboard. The two end shapes are formed to match the inside form of the outboard side of a floorboard frame. Another prior art includes a parking accessory for motorcycles has a frame which provides a first compartment for a license plate, and a second compartment behind the first compartment to carry a plate-like kickstand pad which can be removed and placed under the end of the kickstand when it is desired to park the motorcycle. The kickstand pad prevents penetration of the surface on which the motorcycle is resting and consequent loss of upright support of the cycle. Also another prior art includes a Fender cover includes a relatively soft, non-abrasive first layer which is disposed against a fender and an outer cover which is substantially impermeable to grease and other contaminants for protecting a fender while a mechanic works on an engine. The fender cover is held in place on the fender by means of flexible magnetic elements disposed between the two layers. Further another prior art includes a flexible bump protector panel is attachable to the outer surface of an automobile door to prevent its being dented or nicked by the doors of nearby vehicles. While these devices fulfill their respective, particular objectives and requirements, the aforementioned patents do not disclose a new motorcycle fender cosmetic enhancement/kickstand support.

SUMMARY OF THE INVENTION

The general purpose of the present invention, which will be described subsequently in greater detail, is to provide a new motorcycle fender cosmetic enhancement/kickstand support which has many of the advantages of the fender attachments or kickstand supports mentioned heretofore and many novel features that result in a new motorcycle fender cosmetic enhancement/kickstand support which is not anticipated, rendered obvious, suggested, or even implied by any of the prior art fender attachments or kickstand supports, either alone or in any combination thereof. The present invention includes a planar support member having a top, a bottom, opposed ends and sides, and a thickness and adapted to being magnetically attached to a fender of a motorcycle; and a pad member removably supported by the planar support member. None of the prior art includes the combination of the elements of the present invention.

There has thus been outlined, rather broadly, the more important features of the motorcycle fender cosmetic enhancement/kickstand support in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new motorcycle fender cosmetic enhancement/kickstand support which has many of the advantages of the fender attachments or kickstand supports mentioned heretofore and many novel features that result in a new motorcycle fender cosmetic enhancement/kickstand support which is not anticipated, rendered obvious, suggested, or even implied by any of the prior art fender attachments or kickstand supports, either alone or in any combination thereof.

Still another object of the present invention is to provide a new motorcycle fender cosmetic enhancement/kickstand support for easily enhancing the appearance of motorcycles and to stabilize parked motorcycles.

Still yet another object of the present invention is to provide a new motorcycle fender cosmetic enhancement/kickstand support that allows a user to quickly alter the appearance of motorcycles.

Even still another object of the present invention is to provide a new motorcycle fender cosmetic enhancement/kickstand support that provides a handy and easily accessible tool to support the kickstand and motorcycle when parked.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
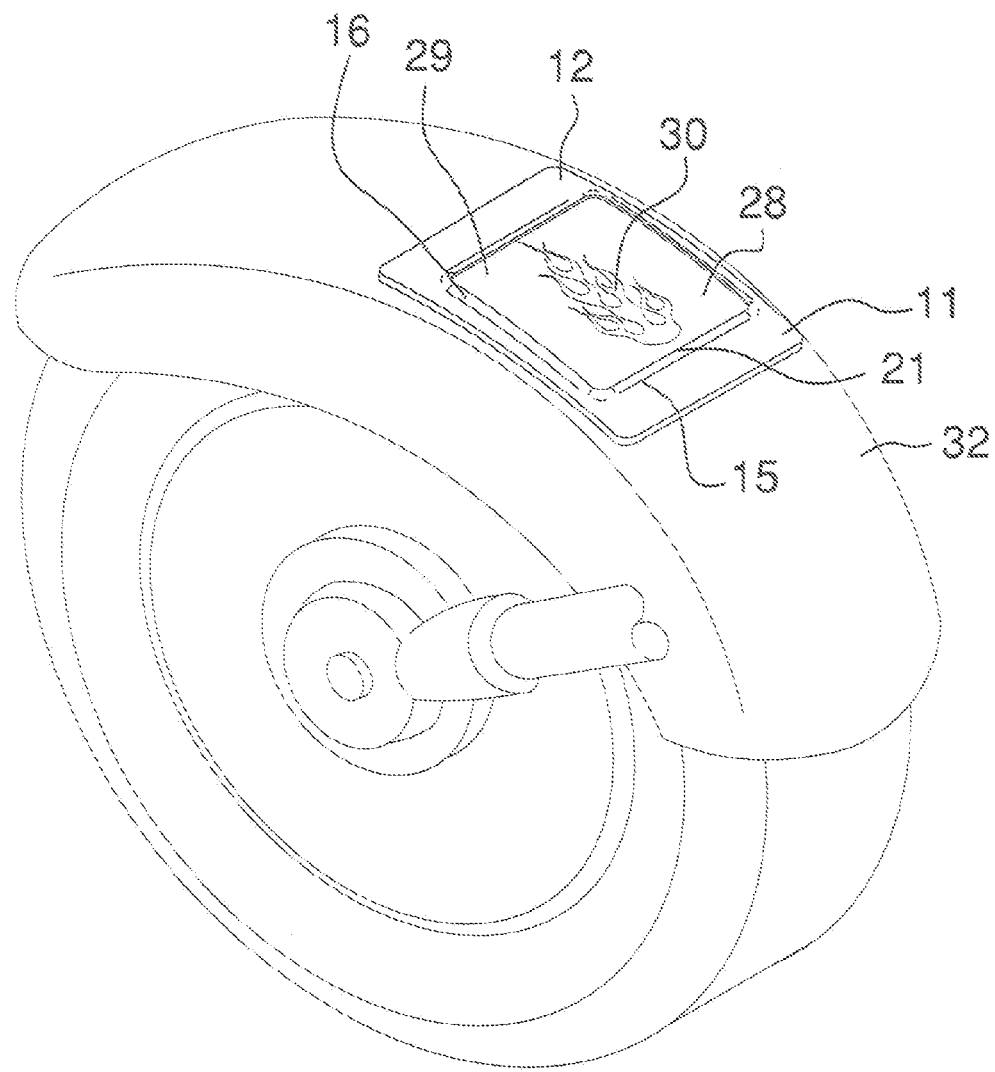
FIG. 1 is a perspective view of a new motorcycle fender cosmetic enhancement/kickstand support according to the present invention.
Figure 2:
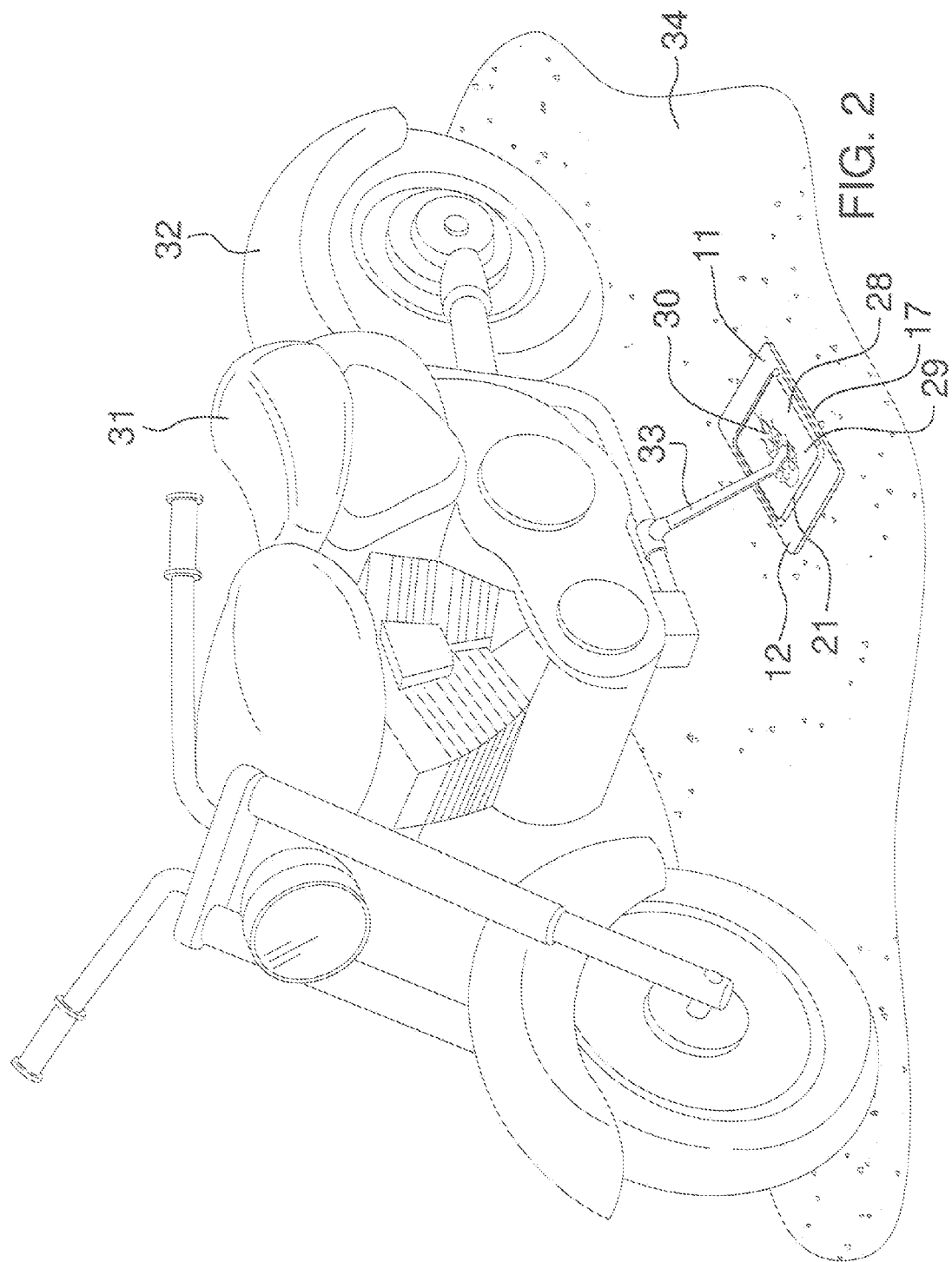
FIG. 2 is another perspective view of the present invention.
Figure 3:
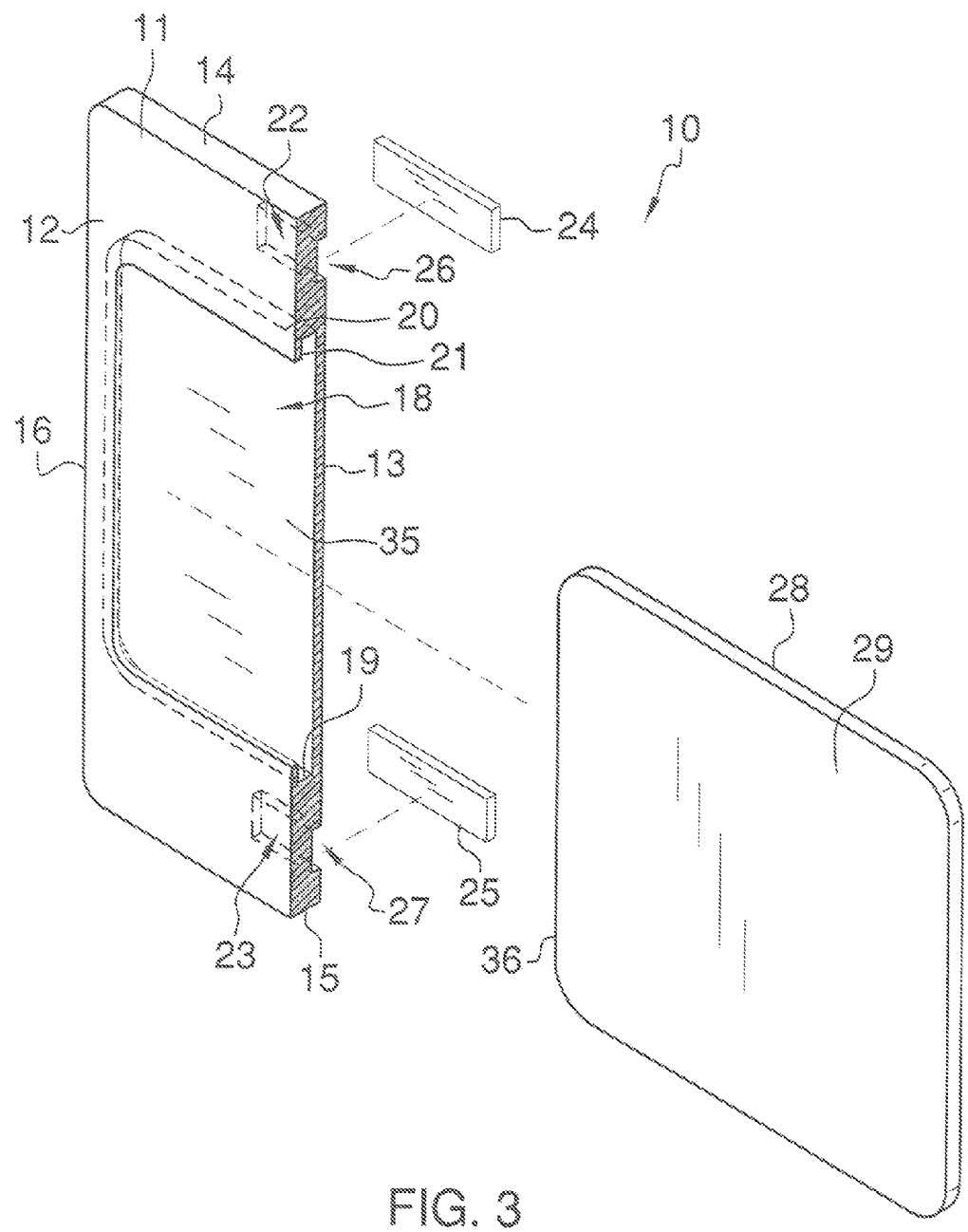
FIG. 3 is longitudinal cross sectional side view of the present invention.

With reference now to the drawings, and in particular to FIGS. 1 through 3 thereof, a new motorcycle fender cosmetic enhancement/kickstand support embodying the principles and concepts of the present invention and generally designated by the reference numeral 10 will be described. As best illustrated in FIGS. 1 through 3, the motorcycle fender cosmetic enhancement/kickstand support 10 may generally comprise a planar support member 11 having a top 12, a bottom 13, opposed ends 14,15 and sides 16,17, and a thickness and adapted to being magnetically attached to a tire fender 32 of a motorcycle 31, preferably the rear tire fender 32; and a pad member 28 removably supported by the planar support member 11. The planar support member 11 preferably made of neoprene may be solid and semi-rigid and may have a recessed area 18 disposed in a top 12 thereof with the bottom 13 being magnetized and adapted to be magnetically attached to and upon the top and rear of the tire fender 32. The recessed area 18 may extend to near the opposed sides 16,17 and ends 14,16 of the planar support member 11 and may be adapted to support a kickstand 33 when the planar support member 11 is positioned upon a ground 34 for use as a kickstand support 10. The planar support member 11 may also include a perimeter wall 19 forming the recessed area 18. The planar support member 11 may further include an endless flange 21 integral to and flush with the top 12 of the planar support member 11 and extending along a top edge 20 of the perimeter wall 19 and disposed inwardly of the recessed area 18. The endless flange 21 may be spaced above a surface 35 of the recessed area 18. The pad member 28 may be a flexible sheet of material having a thickness and having a dimension substantially equivalent to a dimension of the recessed area 18. The pad member 28 may be removably retained in the recessed area 18 between the endless flange 21 and the surface 35 of the recessed area 18 with the endless flange 21 being engagable with a perimeter 36 of the pad member 28 when the pad member 28 is securely disposed in the recessed area 18. The pad member 28 has a top 29 with a selected artistic design 30 displayed thereupon. The pad member 28 may be adapted to support the kickstand 33 of the motorcycle 31 when the pad member 28 is in the recessed area 18 and when the planar support member 11 is being used to support the kickstand 33. The planar support member 11 may also include at least one internal cavity 22 disposed therein near the bottom 13 of the planar support member 11. At least one magnet 24 may be retained in the at least one internal cavity 22 for magnetically attaching the bottom 13 of the planar support member 11 to the fender 32 of the motorcycle 31. The at least one internal cavity 22 may include two or more internal cavities 22,23 disposed near the opposed ends 14,15 of the planar support member 11 with accesses 26,27, which are preferably slots and/or slits, into the two or more internal cavities 22,23 disposed through the bottom 13 of the planar support member 11. Two or more magnets 24,25 may be respectfully retained in the two or more internal cavities 22,23 for magnetically attaching the bottom 13 of the planar support member 11 to the fender 32 of the motorcycle 31.

In use, the planar support member 11 is magnetically attached to the fender 32 of the motorcycle 31 such that the artistic design 30 is publically displayed. The planar support member 11 is magnetically attached upon a top and near a rear of the rear tire fender 32 of the motorcycle 31. A user may remove the planar support member 11 from the fender 32 of the motorcycle 31 as desired and may include positioning the planar support member 11 beneath the motorcycle 31 upon the ground 34 and resting the kickstand 33 of the motorcycle 31 entirely in the recessed area 18 of the planar support member 11 to stabilize the motorcycle 31 and prevent the motorcycle 31 from tipping over when parked.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the motorcycle fender cosmetic enhancement/kickstand support. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of cosmetically enhancing the appearance of a motorcycle and providing a support for a kickstand includes:
    providing a semi-rigid magnetic planar support member having a recessed area and also providing a pad member removably retained in the recessed area and having an artistic design displayed on the pad member;
    magnetically attaching the planar support member to a fender of a motorcycle such that the artistic design is publically displayed; and
    removing the planar support member from the fender of the motorcycle as desired and positioning the planar support member beneath the motorcycle upon a ground and further resting the kickstand of the motorcycle entirely in the recessed area of the planar support member to stabilize the motorcycle and prevent the motorcycle from tipping over when parked.

* * * * *